United States Patent Office 2,714,019
Patented July 26, 1955

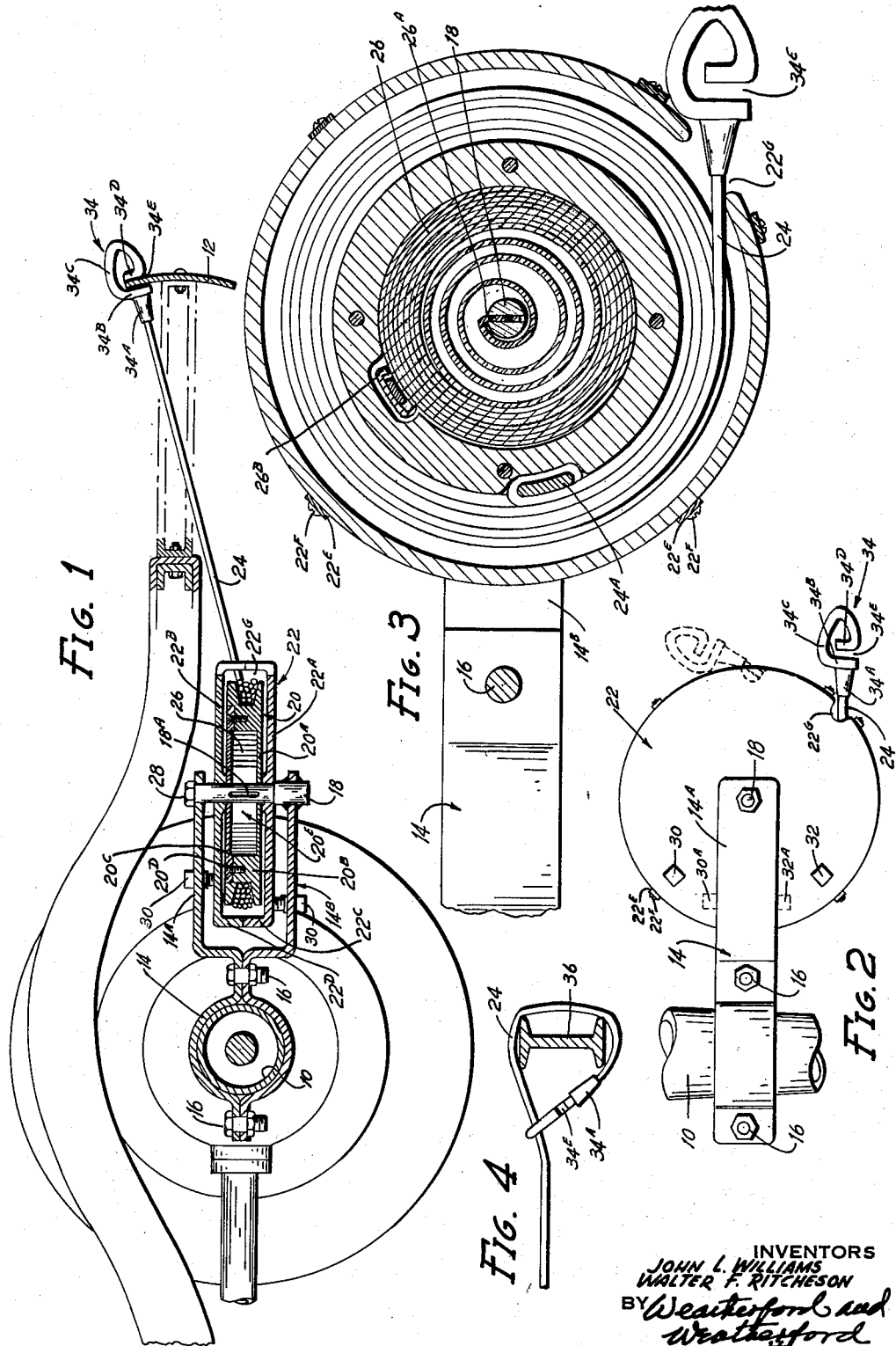

2,714,019
AUTO TOW CABLE

John L. Williams and Walter F. Ritcheson, Memphis, Tenn.

Application March 26, 1952, Serial No. 278,658

3 Claims. (Cl. 280—480)

This invention relates to vehicle towing cables, and winding drums and housing assemblies carried by the towing vehicles for housing said cables when not in use.

The objects of the invention are:

To provide a simple, inexpensive and convenient assembly for fixed attachment to an auto vehicle as emergency equipment for towing other vehicles or for connection of the vehicle carrying the cable to a towing vehicle.

To provide equipment of this class in which tension is always executed on the towing cable when in use to prevent slack in the cable during towing operation and minimize initial and other shocks.

To provide means for housing the towing cable when not in use;

To provide housing means having limited lateral turning movement permitting a substantially direct cable pull on another vehicle which is not in the direct offset line of travel of the towing vehicle; and To provide a simple and efficient cable hook adapted for easy attachment of the cable to and detachment of the cable from another vehicle but substantially free from danger of accidental detachment.

The means by which the foregoing and other objects are accomplished and the manner of their accomplishment will readily be understood from the following specification on reference to the accompanying drawings in which:

Fig. 1 is a sectional side elevational view of the assembly attached to an axle of a vehicle with the hook, for carrying purposes when the device is not in use, engaged with a bumper of the car.

Fig. 2 is a corresponding plan view showing a fragmentary part of a vehicle axle and the housing attached;

Fig. 3 is a larger sectional view showing the interior of the housing cable drum and winding spring; and Fig. 4 is a fragmentary view showing engagement of the towing cable as with the axle of a car to be towed.

Referring now to the drawings in which the various parts are indicated by numerals, 10 is a vehicle axle and 12 the related car bumper. 14 is a two part carrying yoke forming part of the present assembly, the yoke having upper and lower yoke arms 14A, 14B respectively, which are adapted to be rigidly clamped to the axle 10 as by bolts 16; a shaft 18 is rigidly secured to the yoke arm 14B as by welding and extends upward as a vertical axis about which an annular reel 20 may turn, and an enclosing housing 22 may oscillate.

The reel 20 includes a lower disc 20A, an integral annular spool portion 20B around which a towing cable 24 may be wound and an upper disc 20C which is secured to the spool portion 20B as by screws 20D. The bore of the spool and the cover discs form a chamber 20E for a coil spring 26. The post 18 is provided with a slot 18A which is engaged by the inner end 26A (Fig. 3) of the spring, the outer end 26B of the spring being engaged with the bore wall 20B of the spool 20.

The lower and upper discs 20A and 20C of the spool are bored to engage and turn on the post 18. The upper end of the post 18 preferably extends through the upper yoke arm 14A and is rigidly clamped thereto by a nut 28.

The housing 22 comprises lower and upper halves 22A, 22B which are journalled on the post 18 the half 22A underlying and the upper half overlying the spool 20. The housing halves have meeting rim portions 22C, 22D respectively which may be secured together by plates 22E and screws 22F. The rim portions are interrupted by an opening 22G through which the towing cable 24 extends. Lugs 30 and 32 carried by the upper and lower halves extend above and below the yoke arms 14A, 14B respectively and limit the oscillation of the housing.

The towing cable is secured at its inner end 24A to the wall 20B and wound therearound in opposed direction to the spring coil, and is wound around the reel with the spring 26 unwound, in order that unreeling of cable may wind the spring and unwinding of the spring recoil the cable. The outer end of the cable extends through the opening 22G and carries a hook 34. The hook comprises a cable engaging shank 34A and a C-shaped hook portion 34B having a portion 34C continuing from the top of the C toward the shank 34A in opposed relation to the back of the C and terminating in a portion 34D, abruptly bent to extend toward the back of the C-shaped hook and spaced from the shank and the back slightly in excess of cable diameter to provide an entrance slot 34E, which allows engagement of the hook with the cable, after the cable has been looped around an axle 36, or other part of the vehicle to be towed and minimizes disengagement.

After use and disconnection of the cable from the vehicle part to which it has been secured, the spring rewinds the cable within the housing and the hook against the housing. In some cases after the cable has been used and disconnected and the cable is retracted within the housing, the hook 34 may be engaged with a bumper 12, rather than against the housing by the action of the spring.

In installing, the housing 22 is anchored securely by the yoke arms 14 to the vehicle axle 10, the spring 26 holding the hook 34 against the housing.

In use the cable is drawn out of the housing, hooked over some part, as the axle 36, of the vehicle to be towed, or the towing vehicle as the case may be, and the hook 34 engaged with the cable, the restricted cable opening 34E into the hook making accidental disengagement almost impossible. If the vehicle to which attachment is made be out of line to one side or the other of the cable carrying vehicle the housing 22 may turn about the shaft 18 as tension is exerted on the cable to aline or tend to aline the housing opening responsive to the pull. This turning movement is limited by the movement of the stops 30 in one direction to the position 30A against the yoke bars 14A, 14B or by movement of the stops 32 in the opposite direction to the position 32A, against the same bars.

While a preferred specific embodiment of the invention is hereinbefore set out it is to be clearly understood that the invention is not to be limited to the exact construction illustrated and described, and that various modifications of the various details may be made so long as they fall within the purview of the appended claims.

Having described our invention, we claim:

1. Automobile tow cable means, comprising a yoke having horizontally disposed upper and lower arms, a vertical shaft carried by said arms, a casing oscillatably mounted on said vertical shaft, a cable, a reel housed in said casing and carrying said cable, said reel being journalled on said shaft for rotation in a horizontal plane for extension and retraction of said cable, said casing having a tangential aperture remote from said yoke for movement of said cable to and from said casing, stop lugs mounted on said casing and positioned in the plane of said yoke arms, said lugs being radially spaced apart and respectively disposed to engage said yoke under casing oscillation to limit said oscillation against opposite overtravel, the oscillatable mounting of said casing permitting shift of said casing in the plane of rotation of said reel to aline said tangential opening with an object engaged by said cable, whereby pull along said cable is transmitted along a line substantially tangent to said reel and casing, and means for rigidly fixing said yoke to an automobile.

2. Automobile tow cable means, comprising a yoke having a pair of spaced arms, a shaft perpendicular to and carried by said arms, a casing oscillatably mounted on said shaft, a cable, a reel housed in said casing and carrying said cable, said reel being journalled on said shaft for rotation for extension and retraction of said cable, said casing having a tangential aperture remote from said yoke for movement of said cable to and from said casing, stop lugs mounted on said casing and positioned in the plane of said yoke arms, said lugs being radially spaced apart and respectively disposed to engage said yoke under casing oscillation to limit said oscillation against opposite overtravel, the oscillatable mounting of said casing permitting shift of said casing in the plane of rotation of said reel to aline said tangential opening with an object engaged by said cable, whereby pull along said cable is transmitted along a line substantially tangent to said reel and casing, and means for rigidly fixing said yoke to an automobile.

3. Automobile tow cable means, comprising a pair of spaced arms, a shaft perpendicular to and carried by said arms, a casing oscillatably mounted on said shaft, a cable, a reel housed in said casing and carrying said cable, said reel being journalled on said shaft for rotation for extension and retraction of said cable, said casing having an aperture for movement of said cable to and from said casing, stop lugs mounted on said casing and positioned in the plane of at least one of said arms, said lugs being radially spaced apart and respectively disposed to engage said one arm under casing oscillation to limit said oscillation against opposite overtravel, the oscillatable mounting of said casing permitting shift of said casing in the plane of rotation of said reel to aline said opening with an object engaged by said cable, and means for rigidly fixing said arms to an automobile.

References Cited in the file of this patent

UNITED STATES PATENTS

| | | |
|---|---|---|
| 1,291,029 | Lamont | Jan. 14, 1919 |
| 1,566,740 | Forrest | Dec. 22, 1925 |
| 1,574,552 | Chapman | Feb. 23, 1926 |
| 1,587,427 | Schwier | June 1, 1926 |
| 1,695,096 | Hanses | Dec. 11, 1928 |
| 1,839,099 | Helmke | Dec. 29, 1931 |